(12) United States Patent
Andreasen

(10) Patent No.: US 7,481,157 B2
(45) Date of Patent: Jan. 27, 2009

(54) NUTCRACKER

(76) Inventor: Michael S. Andreasen, 11341 Hall Dr., Nampa, ID (US) 83651

( * ) Notice: Subject to any disclaimer, the term of this patent is extended or adjusted under 35 U.S.C. 154(b) by 585 days.

(21) Appl. No.: 11/066,698

(22) Filed: Feb. 24, 2005

(65) Prior Publication Data

US 2006/0185532 A1    Aug. 24, 2006

(51) Int. Cl.
*A23N 5/00* (2006.01)

(52) U.S. Cl. .......................... 99/575; 99/574

(58) Field of Classification Search .............. 99/574, 99/575, 608, 628, 629, 630
See application file for complete search history.

(56) References Cited

U.S. PATENT DOCUMENTS

| | | | | |
|---|---|---|---|---|
| 807,551 | A * | 12/1905 | Gordon | 99/575 |
| 1,025,405 | A * | 5/1912 | King | 99/575 |
| 1,194,318 | A | 8/1916 | Power | |
| 1,211,978 | A | 1/1917 | Spitz | |
| 1,234,767 | A * | 7/1917 | Junker | 99/593 |
| 1,274,803 | A | 1/1918 | Spitz | |
| 1,266,075 | A | 5/1918 | Spitz | |
| 1,688,966 | A * | 10/1928 | Hill | 99/575 |
| 2,129,679 | A | 6/1938 | Dragon | 146/11 |
| 2,138,302 | A * | 11/1938 | Kilner | 99/641 |
| 2,220,320 | A | 11/1940 | Dragon | 146/11 |
| 2,302,227 | A | 11/1942 | Kasser | 146/219 |
| 3,138,823 | A * | 6/1964 | Langner | 452/145 |
| 4,819,331 | A | 4/1989 | Joyama | 30/120.2 |
| 4,907,840 | A | 3/1990 | Hawkins | 297/193 |
| 4,928,590 | A | 5/1990 | Joyama et al. | 99/576 |
| 4,996,917 | A * | 3/1991 | Burlock et al. | 99/575 |
| 5,076,158 | A | 12/1991 | Tippett | 99/575 |
| 5,404,809 | A | 4/1995 | Ham | 99/575 |
| 6,397,737 | B1 | 6/2002 | Eisel | 99/571 |

OTHER PUBLICATIONS

"Embarcadero Home Canner: The World's Best Nutcracker" Dec. 22, 2004 http://www.ehcan.com/Nutcracker.html.
"Universal Nutcracker: Works on all varieties of round nuts" Dec. 22, 2204 http://www.universalnutcracker.com/specs.html.

* cited by examiner

*Primary Examiner*—Reginald L Alexander
(74) *Attorney, Agent, or Firm*—Pedersen & Co., PLLC; Ken J. Pedersen; Barbara S. Pedersen

(57) ABSTRACT

A nutcracker utilizes a conical member with a textured exterior surface rotatably mounted and centered inside a vertical cylinder with a textured interior surface. The nuts occupy a cracking zone between the textured exterior surface and the textured interior surface. As the conical member rotates, gravity rolls the nuts down in a spiraling path into an increasingly smaller cracking zone until the pressure on the nuts between the textured exterior surface and the textured interior surface causes the shells to crack and the nuts to break into halves and thirds.

12 Claims, 8 Drawing Sheets

NUTCRACKER

BACKGROUND OF THE INVENTION

1. Field of the Invention

The present invention relates to machines for cracking multiple nuts. More particularly, it cracks nuts by rolling them between two surfaces which move relative to one another and become closer together, increasing the pressure on the nuts as the nuts are pulled downward by gravity into a smaller cracking zone.

2. Related Art

Power, U.S. Pat. No. 1,194,318, discloses a conical hopper, a conical rotor mounted within the hopper, means for operating the rotor, there being a downwardly decreasing interspace between the rotor and the hopper, the hopper being provided with downwardly ranging channels formed in its inner walls, and the rotor being provided with spirally produced channels in its periphery, said channels in the hopper walls being angular in formation and separated by edge portions to which the material is presented upon the rotation of the rotor, and the rotor being provided in the channels with spaced pins projecting beyond the periphery of the rotor.

Spitz, U.S. Pat. No. 1,274,803, discloses a cone-shaped hopper or shell with vertically-disposed ribs on its upper portion and teeth on its bottom portion, and an upright conical member with spiral ribs on its upper portion and teeth on its lower member, the teeth of the hopper and conical member having abrupt faces facing in opposite directions.

Dragon, U.S. Pat. No. 2,129,679, discloses two conical members concentrically mounted one within the other so as to provide a downwardly diminishing substantially annular and conical space or chamber.

Kasser, U.S. Pat. No. 2,302,227, discloses a process of cracking and shelling nuts which consists in rolling the nuts between opposite compressible surfaces so that the nuts are partly embedded in said surfaces, and forcing the rolled nuts at intervals on said surfaces over rigid cracking surfaces.

SUMMARY OF THE INVENTION

The present invention is a nutcracker comprising a conical member with a textured exterior surface inside a vertical cylinder with a textured interior surface. Nuts are placed in the space between the conical member and the vertical cylinder. As the conical member rotates within the vertical cylinder, gravity forces the nuts to roll downward into a cracking zone of increasingly reduced space, until the pressure between the conical member and the vertical cylinder causes the shells of the nuts to crack.

BRIEF DESCRIPTION OF THE DRAWINGS

The accompanying drawings illustrate several aspects of embodiments of the present invention. The drawings are for the purpose only of illustrating preferred modes of the invention, and are not to be construed as limiting the invention.

DESCRIPTION OF THE PREFERRED EMBODIMENTS

Figure 1:
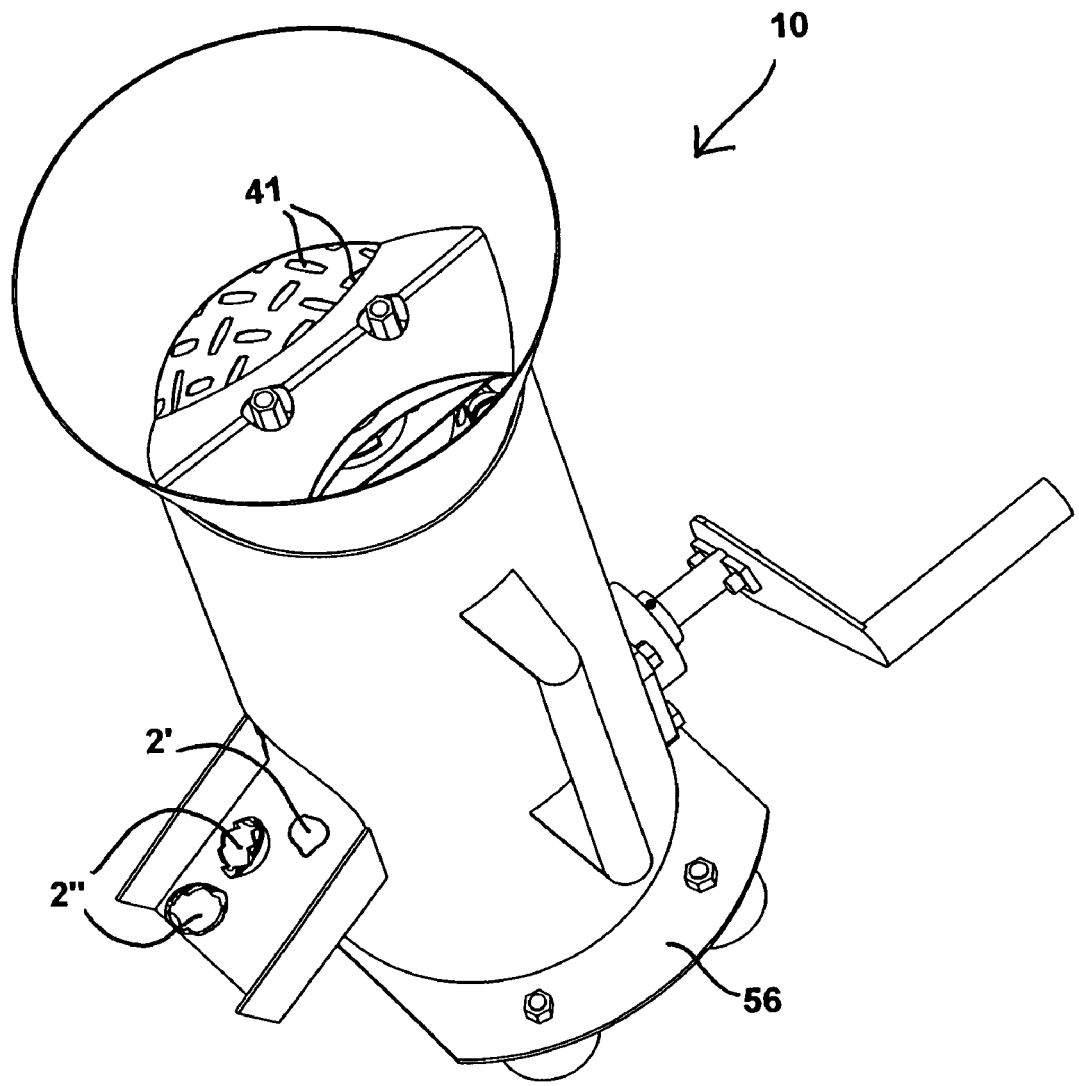
FIG. 1 is a perspective view of the preferred embodiment of the present invention.
Figure 2:
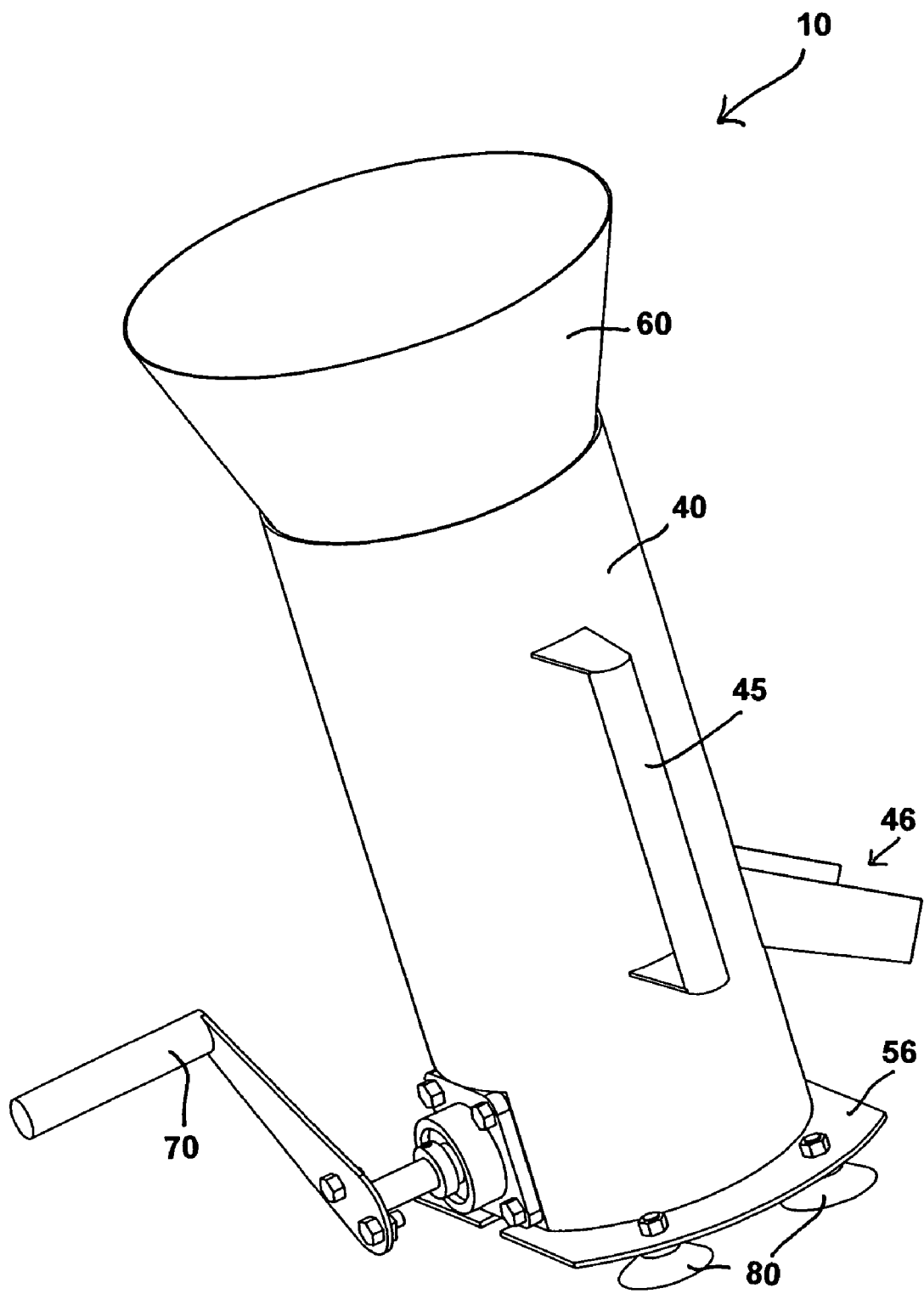
FIG. 2 is another perspective view of the preferred embodiment shown in FIG. 1.
Figure 3:
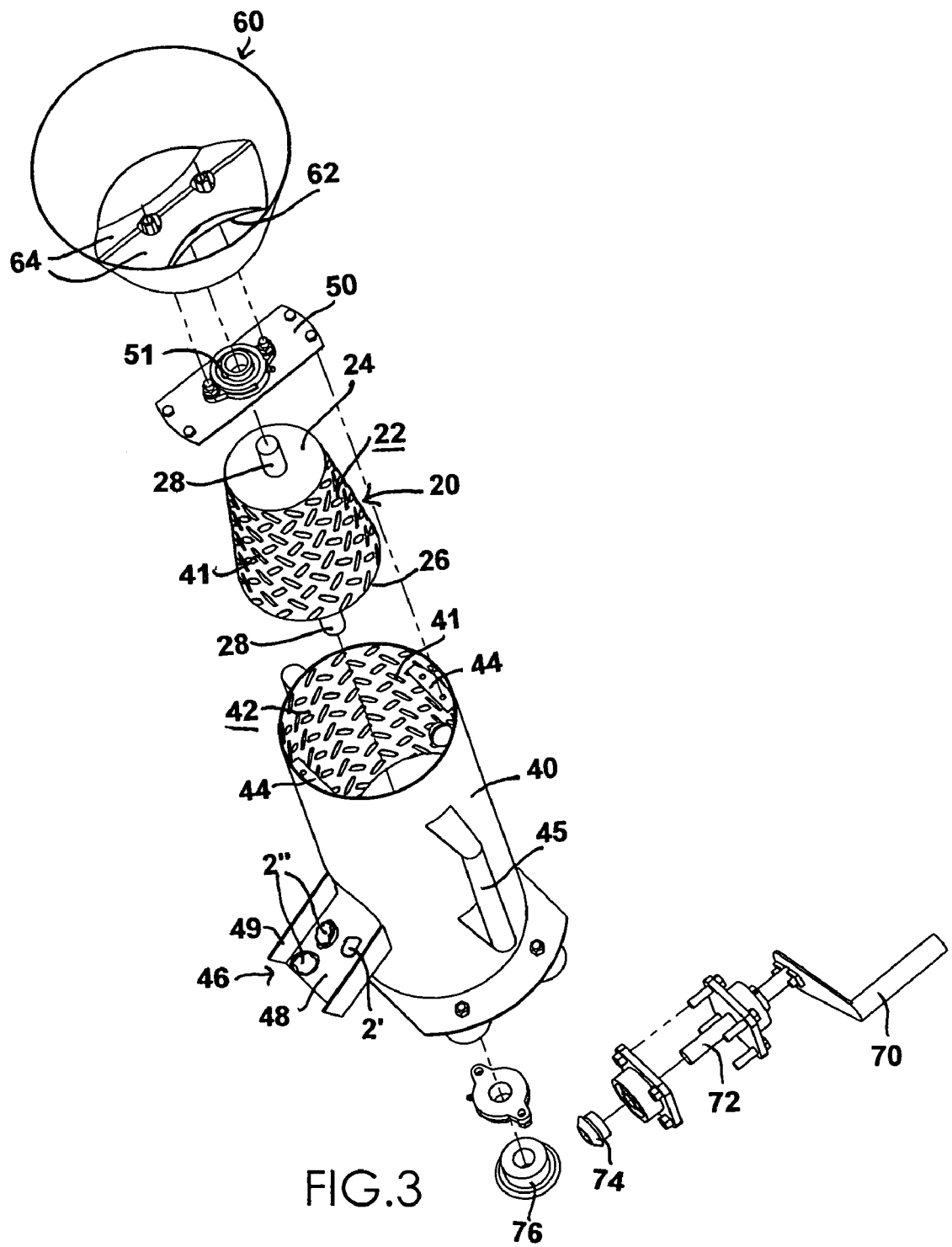
FIG. 3 is an exploded view of the preferred embodiment shown in FIGS. 1-2.
Figure 4:
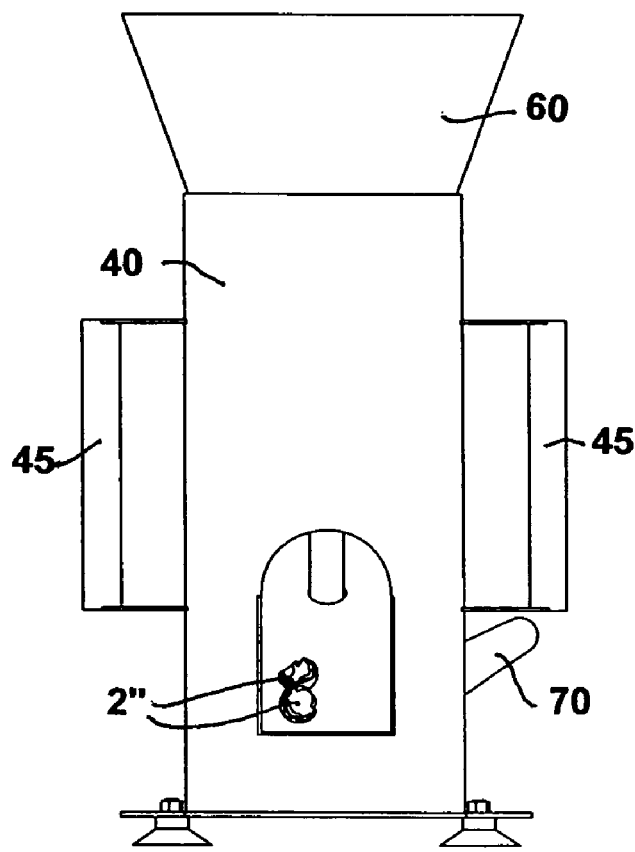
FIG. 4 is a front view of the preferred embodiment shown in FIGS. 1-3.
Figure 5:
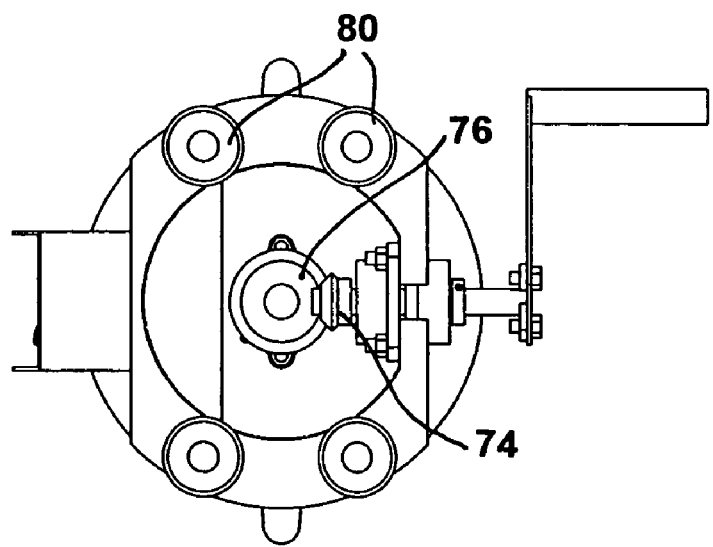
FIG. 5 is a bottom view of the preferred embodiment shown in FIGS. 1-4.
Figure 6:
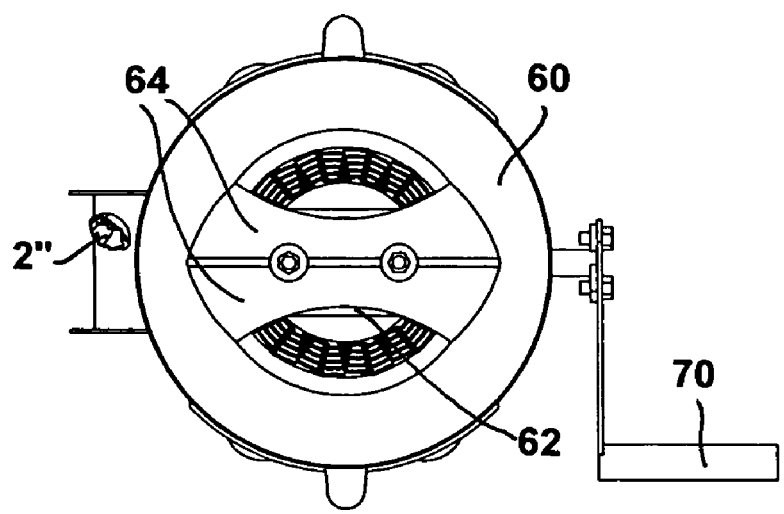
FIG. 6 is a top view of the preferred embodiment shown in FIGS. 1-5.
Figure 7:
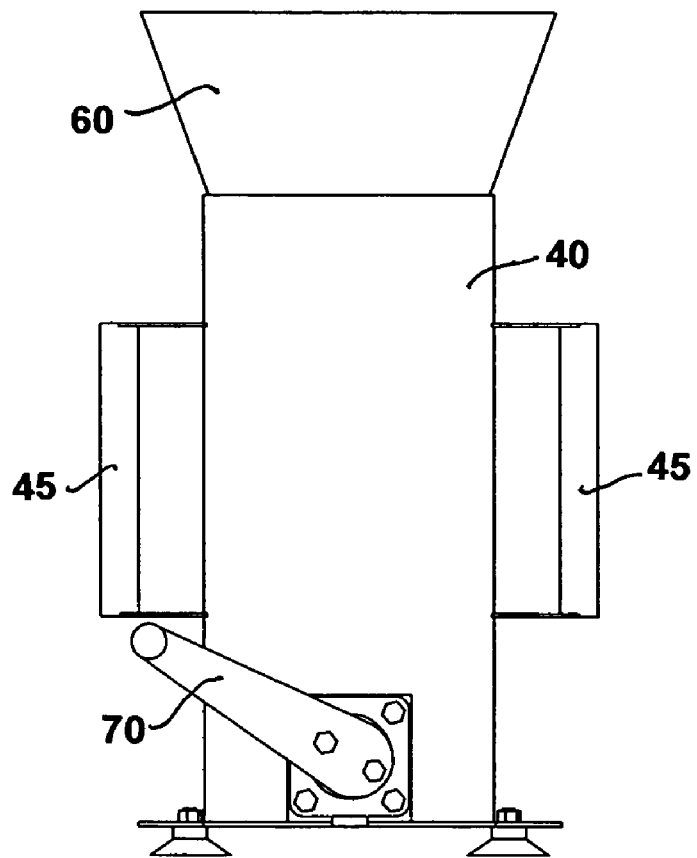
FIG. 7 is a rear view of the preferred embodiment shown in FIGS. 1-6.
Figure 8:
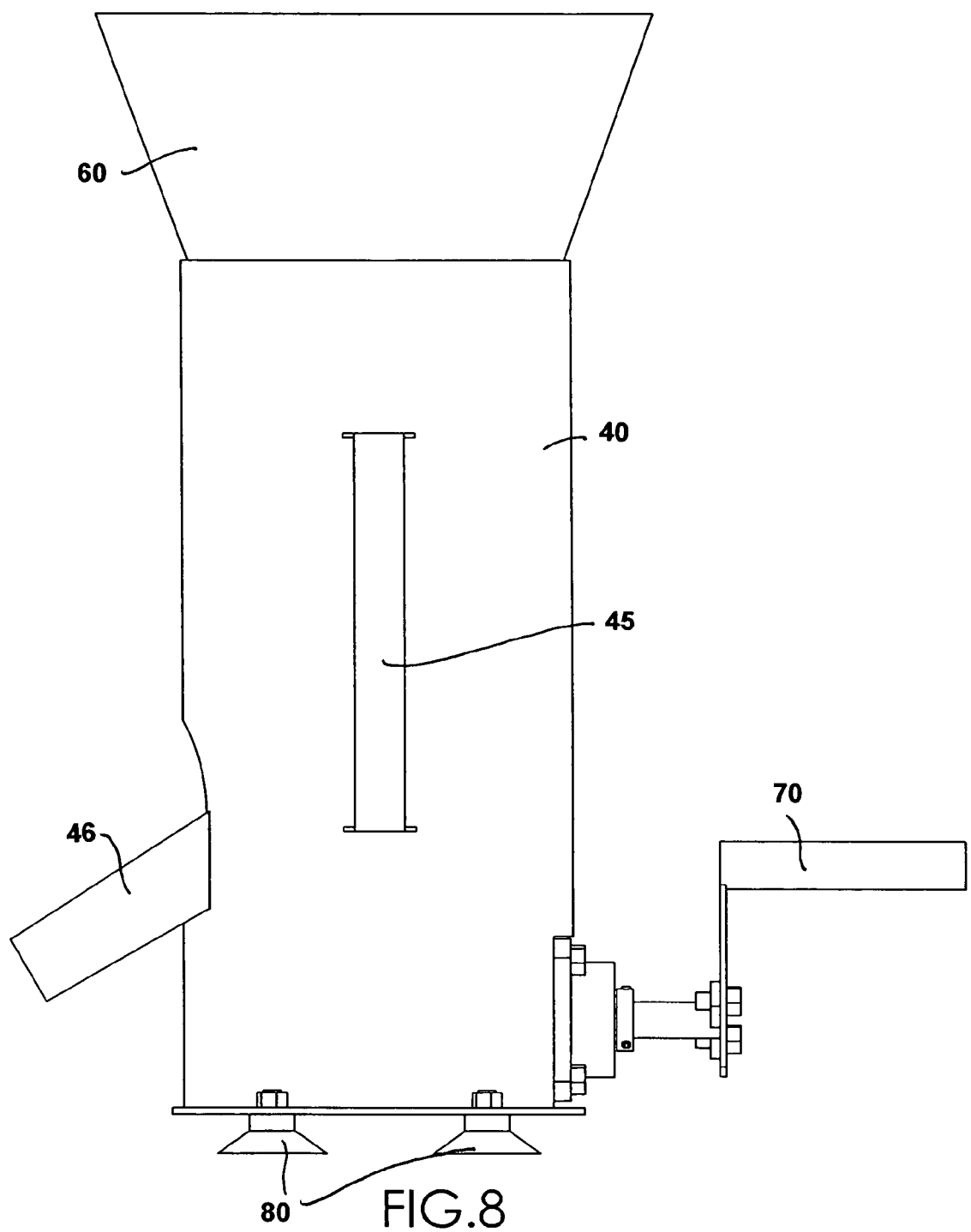
FIG. 8 is a side view of the preferred embodiment shown in FIGS. 1-7.
Figure 9:
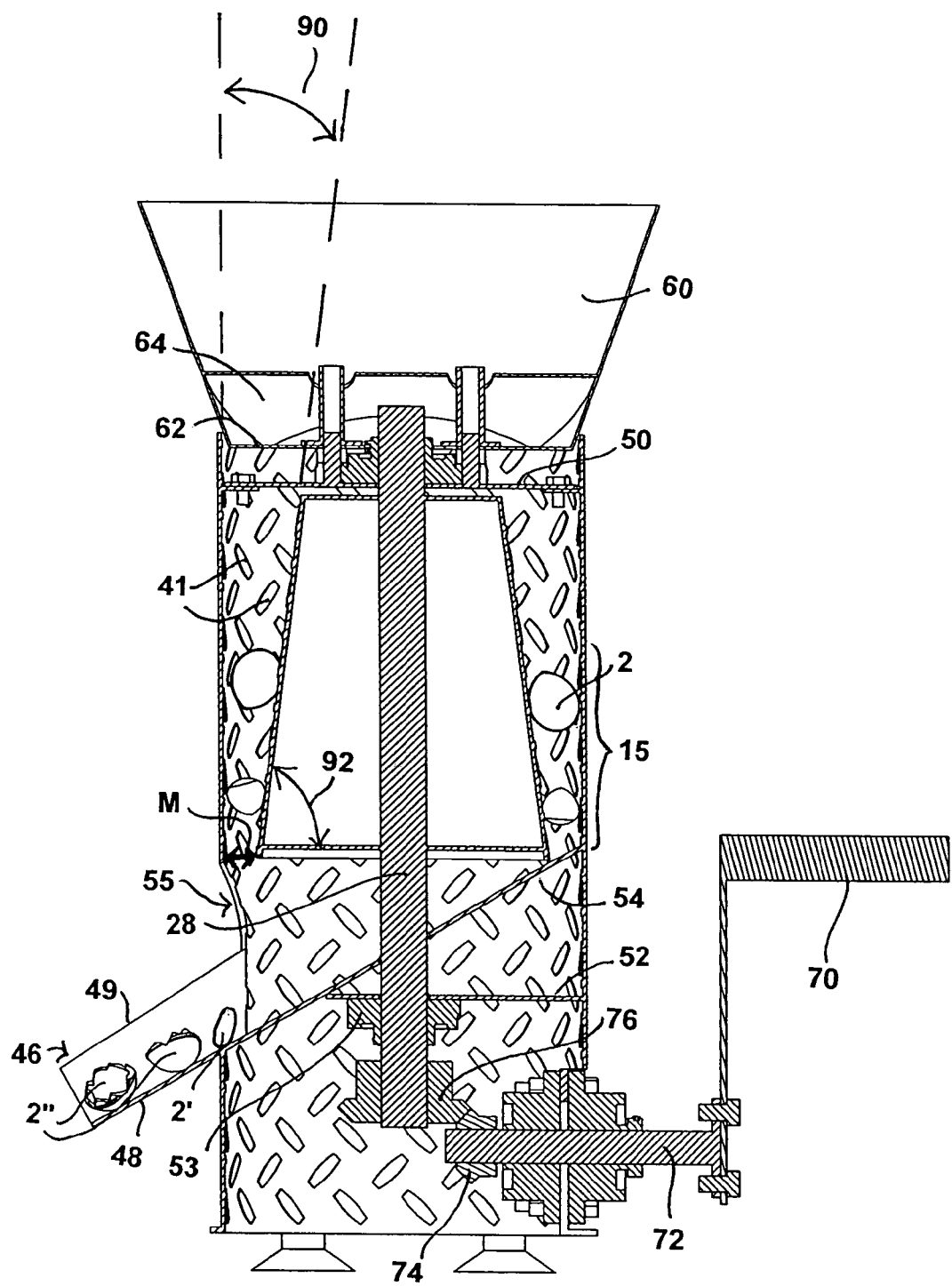
FIG. 9 is a cross-sectional view of the preferred embodiment shown in FIGS. 1-8 taken from the side.
Figure 10:
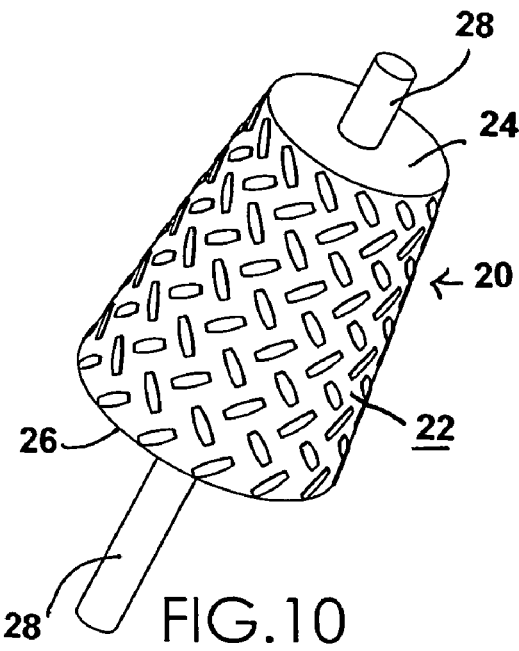
FIG. 10 shows the conical member and rod of the preferred embodiment shown in FIGS. 1-9.
Figure 11:
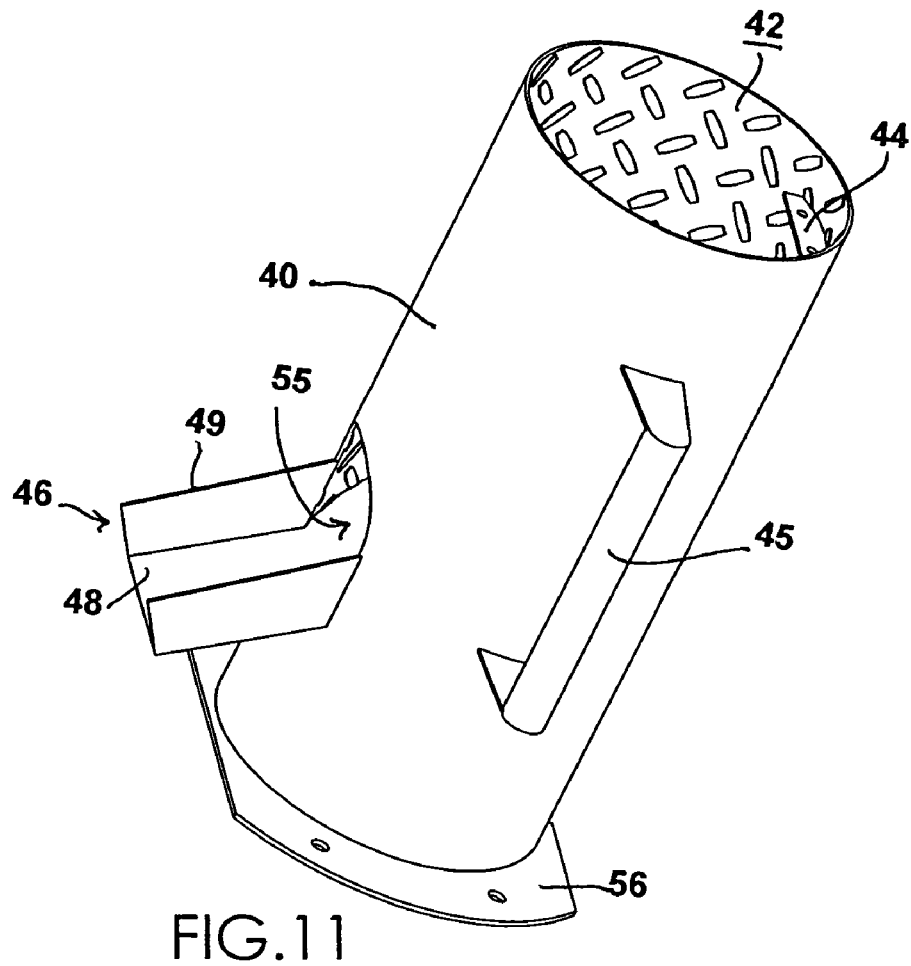
FIG. 11 shows the vertical cylinder, handles, and chute of the preferred embodiment shown in FIGS. 1-9.

The preferred embodiment of the present invention is a nutcracker 10 which cracks the shells of nuts 2 by utilizing gravity to roll the nuts 2 downward into an increasingly narrow cracking zone 15 between a vertical cylinder 40 and a conical member 20, as shown in FIG. 9. A description of the preferred embodiment of the invention follows.

The vertical cylinder 40 is the structural core of the nutcracker 10. An open cylindrical shape, with open circles at each end and walls extending perpendicularly to the planes of the circles, is preferred because of its ease of manufacture. The vertical cylinder 40 is preferably formed from a rectangular sheet of metal formed into a right, circular cylinder, and welded together at the ends that come together, and preferably has a diameter of eight inches. Tread plate is preferred for the sheet of metal because it is readily available and inexpensive in the welding industry, and easy to form into the desired cylindrical shape. Its elongated protrusions 41 that extend no more than one-eighth of an inch from the surrounding plate surface and are at right angles to each other "woven" into a pattern at regular intervals as shown in FIGS. 1, 3, 9, 10, and 11, allow the vertical cylinder to grip the nuts 2 to be cracked. The vertical cylinder 40 will preferably be formed with the treads facing inward, forming a textured interior surface 42 of the vertical cylinder. It is envisioned that tread plate with textures other than that shown, or rigidized metal or dimpled metal could be used as alternatives to the illustrated tread plate. The sheet of metal may be made of any kind of steel; however, stainless steel is preferred because it is the most sanitary material and easily washed. Aluminum, on the other hand, would wear down after repeated use and is therefore not desired.

The vertical cylinder 40 preferably has handles 45 welded onto each side of the vertical cylinder 40, which allow the nutcracker 10 to be carried and controlled once the nutcracker 10 is placed on the work surface. Welded onto the bottom of the vertical cylinder 40 will preferably be a bottom plate 56, which prevents the vertical cylinder 40 from digging into the work surface.

Four eight-pound manual release suction cups 80, each two inches in diameter, are preferably bolted onto the bottom plate 56, to prevent the nutcracker 10 from moving once it has been placed on the work surface; push-button suction cups could also be used. However, the nutcracker 10 could also be clamped onto the work surface, or even bolted onto the work surface.

A first cross-arm bearing support 50 will preferably be attached at or near the top or the vertical cylinder 40; it is envisioned that the first cross-arm bearing support 50 could either be welded onto the vertical cylinder 40 directly, or fastened onto landings 44 which are welded onto the vertical cylinder 40. The first cross-arm bearing support will preferably have a one-inch first bearing 51 attached to it which is configured to receive a rod 28 and allow the rod 28 to spin in the center of the vertical cylinder 40. The first cross-arm bearing support 50 will preferably also have smaller holes which are configured to receive bolts for the purpose of attaching a hopper 60 to the vertical cylinder 40.

The hopper 60 is preferably an inverted partial cone, and serves as a funnel to allow more nuts 2 to be placed into the nutcracker 10. The hopper 60 is manufactured as a separate piece from the vertical cylinder 40. The hopper 60 is preferably made of sixteen-gauge sheet metal. The hopper 60 preferably has a horizontal plate 62 with small holes adapted to receive bolts, as well as a pair of slanted plates 64 with apertures adapted to receive bolts, all three plates being welded onto the hopper 60. Means other than bolts to fasten the hopper 60 to the vertical cylinder 40 are envisioned. The slanted plates 64 are slanted to allow the nuts 2 to fall down into the vertical cylinder 40. The configuration of horizontal plate 62 and slanted plates 64 have the purposes of securing the hopper 60 to the vertical cylinder 40, and preventing hands from going into the vertical cylinder 40 and becoming injured. When the hopper 60 is placed onto the vertical cylinder 40, the hopper 60 and vertical cylinder 40 preferably form an angle of 161 degrees.

As shown in FIG. 9, a first plate 54 is preferably attached to the entire interior perimeter of the vertical cylinder 40. The first plate 54 preferably is made of sheet metal and has a smooth top surface, has a hole in its center that is adapted to allow a rod 28 to pass through and spin, and is slanted from the horizontal to allow shelled nuts 2 (comprising nut meat 2' and shells 2") to slide down along the first plate 54 and out of the vertical cylinder 40 through an opening 55 in the vertical cylinder 40, preferably exiting the vertical cylinder 40 along a spout 46.

The spout 46 is preferably made from the same piece of sheet metal as the first plate 54, and preferably has a bottom portion 48 which is parallel to the first plate 54, and two side portions 49 which serve to guide the nuts 2 in a uniform direction as they exit the nutcracker 10.

A second plate 52 is preferably attached to the vertical cylinder 40 and to the bottom of the first plate 54, and has a one-inch second bearing 53 configured to receive a rod 28 and allow the rod 28 to spin. Below the second plate 52 is a bevel gear comprising a first bevel wheel 74 and a second bevel wheel 76. The first bevel wheel 74 is keyed to hold the rod 28 in place, the rod 28 also being keyed at its bottom end. The second bevel wheel 76 meshes with the first bevel wheel 74. The second bevel wheel 74 is attached to a shaft 72 and crank 70, which allow the user to turn the rod 28 within the vertical cylinder 40, causing the conical member 20 to rotate. However, it is envisioned that there are other ways to turn the rod 28 and conical member 20, such as with a motor with two sprockets and a chain, or by using a rod 28 long enough to extend beyond the hopper 60 and connected to a crank to the top end of the rod 28.

The second essential element of the nutcracker 10 besides the vertical cylinder 40 is the conical member 20. The conical member 20 is centered in the vertical cylinder 40. The conical member 20 preferably has a broad end 26 with diameter of seven inches, a narrow end 24 with diameter of four-and-one-half inches, and a height of eight inches. The conical member 20 is preferably hollow. It is preferably made of the same material as the vertical cylinder, with the treads facing outward to form a textured exterior surface 22. For manufacture of the conical member 20, the tread plate is cut with two arcs of different radii centered upon the same point. A sheet of metal, preferably also tread plate, is also used to close the narrow end 24 of the conical member 20 and the broad end 26 of the conical member 20. However, if tread plate is used to close the narrow end 24 and the broad end 26, the treads will face inward so that the exterior portions of the narrow end 24 and broad end 26 are smooth. A single rod 28 preferably extends through and is welded into the center of the narrow end 24 and the broad end 26. The rod 28 preferably has a diameter of one inch. However, two separate rods could also be used, with one extending from the narrow end 24 and the other extending from the broad end 26, and still achieve the purposes of the invention. The angle 92 between the textured exterior surface 22 and the broad end 26 is preferably between 80 and 84 degrees, and most preferably 82 degrees.

The area between the textured exterior surface 22 and the textured interior surface 42 forms a cracking zone 15. The textured interior surface 42 is vertical in the cracking zone 15, as the textured interior surface 42 is preferably vertical at all points. The textured interior surface 42 is continuous from the top of the vertical cylinder 40 though the cracking zone 15 to the bottom of the vertical cylinder 40 because the vertical cylinder 40, of which the textured interior surface 42 is a part, is inexpensively made from a single rectangular piece of sheet metal, preferably tread plate, bent into a right cylinder and welded together. The textured exterior surface 22 is also continuous from the narrow end 24 of the conical member 20 through the cracking zone 15 to the broad end 26 of the conical member 20 because the textured exterior surface 22 is also made from a single piece of sheet metal, preferably tread plate.

An angle 90 between the textured exterior surface 22 of the conical member 20 and the textured interior surface 42 of the vertical cylinder 40 causes the cracking zone 15 between the textured exterior surface 22 and textured interior surface 42 to decrease as the nuts 2 are pulled downward by gravity. As the conical member 20 spins within the vertical cylinder 40, or alternatively, as the conical member 20 is alternately spun in one direction and then the other, gravity causes the nuts 2 to roll downward and the cracking zone 15 is decreased, resulting in increasing pressure applied to the nuts 2 as they are squeezed between the textured exterior surface 22 and textured interior surface 42.

If either the textured exterior surface 22 or the textured interior surface 42 were smooth, then the nuts 2 would slip and move upward, never breaking or cracking. This is why tread plate is used to grip the nuts—its elongated protrusions 41 which protrude no more than one-eighth of an inch and are at right angles to each other woven into a pattern at regular intervals, cause consistent gripping and cracking of the nuts because of the even distribution of pressure, but not tearing into the shells and creating small pieces which must be cleaned.

If the angle 90 were too great, then the nuts 2 would also slip and move upward, never breaking or cracking. However, if the angle 90 were two small, then the nuts 2 would be crushed and broken repeatedly as the pressure was applied over a greater distance, causing them to break into many small pieces. The inventor has found that an angle 90 between six and ten degrees, and preferably eight degrees, and a minimum cracking zone width M between the bottom part of the textured exterior surface 22 and textured interior surface 42 of three-eighths of an inch to five-eighths of an inch, and preferably seven-sixteenths to one-half of an inch, allows the nutcracker 10 to crack any type of nuts 2 except peanuts. No adjustment of the nutcracker 10 is needed to crack different types of nuts 2.

When the nuts 2 are poured between the vertical cylinder 40 and the conical member 20 and the conical member is rotated, the nuts 2 move downward, the shells of the nuts crack, and the nuts break into halves and thirds, fall onto the first plate 54, and slide out of the nutcracker 10 along the spout 46, as shown in FIG. 9. Walnuts begin cracking when they are about half-way down from the top of the conical member 20, and are usually cracked by the time they are two inches down from this half-way point. It has been found that 216 pounds of walnuts per hour, or one bushel of walnuts every ten minutes, can be cracked by hand using the embodiment described herein.

Although this invention has been described above with reference to particular means, materials and embodiments, it is to be understood that the invention is not limited to these disclosed particulars, but extends instead to all equivalents within the scope of the following claims.

I claim:

1. A nutcracker comprising:
   a vertical cylinder with a textured interior surface made from a single rectangular piece of tread plate, wherein the vertical cylinder comprises an opening with a spout extending from the bottom of the opening;
   a conical member with a textured exterior surface made from an arced piece of sheet metal welded together to form a conical shape, a first circular piece of sheet metal welded onto the conical member to form a narrow end, and a second circular piece of sheet metal welded onto the conical member to form a broad end;
   a rod extending from the narrow end of the conical member;
   a rod extending from the broad end of the conical member;
   a cross-arm bearing support connected to a top of the vertical cylinder, wherein the cross-arm bearing support is connected to a first bearing which is configured to receive the rod and allow the rod to spin within the first bearing;
   a first plate slanted from a horizontal plane and connected to the vertical cylinder, wherein the first plate is configured to receive the rod and allow the rod to spin within the first plate;
   wherein the conical member is vertically centered within the vertical cylinder when the bearing receives the rod and the first plate receives the rod so that:
      the textured exterior surface and textured interior surface form a cracking zone with a minimum distance between the textured exterior surface and textured interior surface between seven-sixteenths and one-half of an inch, and
      an angle between the textured interior surface and the textured exterior surface is eight degrees; and
   a second plate attached to the vertical cylinder below the first plate and being connected to a second bearing which is configured to receive the rod and allow the rod to spin within the second bearing.

2. The nutcracker of claim 1, further comprising:
   an opening in the vertical cylinder; and
   a spout connected to said first plate and extending out of the vertical cylinder from a bottom of the opening in the vertical cylinder, so that said first plate receives shelled nuts from said cracking zone and the shelled nuts slide down said first plate to said spout to exit the nutcracker.

3. The nutcracker of claim 2, wherein said vertical cylinder has an interior perimeter; and wherein said first plate is attached to the entire interior perimeter of the vertical cylinder.

4. The nutcracker of claim 1, further comprising:
   a hopper that is a bottom portion of a cone and that has a narrow hopper end and a wide hopper end; wherein said narrow hopper end is inserted into a top end of the vertical cylinder.

5. The nutcracker of claim 4, wherein the hopper is a separate piece from the vertical cylinder and is secured to the vertical cylinder by fasteners.

6. The nutcracker of claim 4, wherein an angle between the hopper and the vertical cylinder is one hundred and sixty-one degrees.

7. A nutcracker comprising:
   a vertical cylinder with a textured interior surface made from a single rectangular piece of tread plate, wherein the vertical cylinder comprises an opening with a spout extending from the bottom of the opening;
   a conical member with a textured exterior surface made from an arced piece of sheet metal welded together to form a conical shape, a first circular piece of sheet metal welded onto the conical member to form a narrow end, and a second circular piece of sheet metal welded onto the conical member to form a broad end;
   a rod extending from the narrow end of the conical member;
   a rod extending from the broad end of the conical member;
   a cross-arm bearing support connected to a top of the vertical cylinder, wherein the cross-arm bearing support is connected to a first bearing which is configured to receive the rod and allow the rod to spin within the first bearing;
   a first plate slanted from a horizontal plane and connected to the vertical cylinder, wherein the first plate is configured to receive the rod and allow the rod to spin within the first plate;
   wherein the conical member is vertically centered within the vertical cylinder when the bearing receives the rod and the first plate receives the rod so that:
      the textured exterior surface and textured interior surface form a cracking zone with a minimum distance between the textured exterior surface and textured interior surface of three-eighths to five-eighths of an inch; and
      an angle between the textured interior surface and the textured exterior surface is six to ten degrees; and
   a second plate attached to the vertical cylinder below the first plate and being connected to a second bearing which is configured to receive the rod and allow the rod to spin within the second bearing.

8. The nutcracker of claim 7, further comprising:
   an opening in the vertical cylinder; and
   a spout connected to said first plate and extending out of the vertical cylinder from a bottom of the opening in the vertical cylinder, so that said first plate receives shelled nuts from said cracking zone and the shelled nuts slide down said first plate to said spout to exit the nutcracker.

9. The nutcracker of claim 8, wherein said vertical cylinder has an interior perimeter; and wherein said first plate is attached to the entire interior perimeter of the vertical cylinder.

10. The nutcracker of claim 7, further comprising:
    a hopper that is a bottom portion of a cone and that has a narrow hopper end and a wide hopper end; wherein said narrow hopper end is inserted into a top end of the vertical cylinder.

11. The nutcracker of claim 10, wherein the hopper is a separate piece from the vertical cylinder and is secured to the vertical cylinder by fasteners.

12. The nutcracker of claim 10, wherein an angle between the hopper and the vertical cylinder is one hundred and sixty-one degrees.

* * * * *